United States Patent [19]

Kehrmann

[11] Patent Number: 5,893,570

[45] Date of Patent: Apr. 13, 1999

[54] FABRIC COATED SLED OF COMPOSITE CONSTRUCTION

[75] Inventor: Michael F. Kehrmann, Lake Zurich, Ill.

[73] Assignee: ERO Industries, Inc., Mt. Prospect, Ill.

[21] Appl. No.: 08/738,057

[22] Filed: Oct. 25, 1996

[51] Int. Cl.[6] ............................................. B62B 15/00
[52] U.S. Cl. ..................................................... 280/18.1
[58] Field of Search ............................ 280/18, 18.1, 19

[56] References Cited

U.S. PATENT DOCUMENTS

| | | |
|---|---|---|
| 2,493,315 | 1/1950 | Ruka . |
| 2,971,767 | 2/1961 | Eaton . |
| 3,140,878 | 7/1964 | Davis . |
| 3,628,206 | 12/1971 | Mecham ........................ 280/18.1 |
| 4,405,673 | 9/1983 | Fridley et al. . |
| 4,732,399 | 3/1988 | Reilly et al. . |
| 5,401,048 | 3/1995 | Hopkins . |

FOREIGN PATENT DOCUMENTS 623525  6/1981  Switzerland .

*Primary Examiner*—Kevin Hurley
*Assistant Examiner*—Faye M. Fleming
*Attorney, Agent, or Firm*—Vedder Price Kaufman & Kammholz

[57] ABSTRACT

A fabric sled for sliding upon snow has a composite construction in which an interior cushioning assembly is enclosed within opposing top and bottom cover portions. The top cover portion is formed from a durable fabric material and the bottom cover portion is formed from a smooth, durable and waterproof material. The outer edges of the top and bottom cover portions enclosed by an outer edge and are stitched together around the perimeter of the sled along the outer edge to form an integral unit that contains the cushioning assembly.

24 Claims, 2 Drawing Sheets

U.S. Patent   Apr. 13, 1999   Sheet 1 of 2   5,893,570
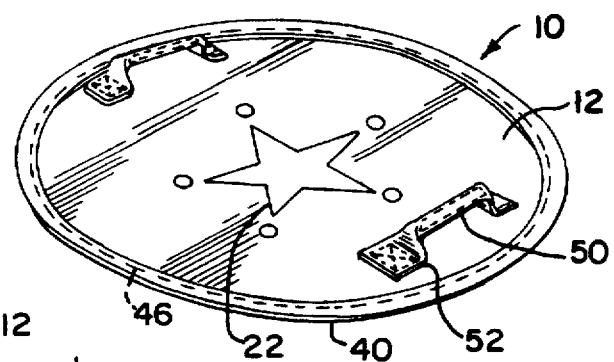
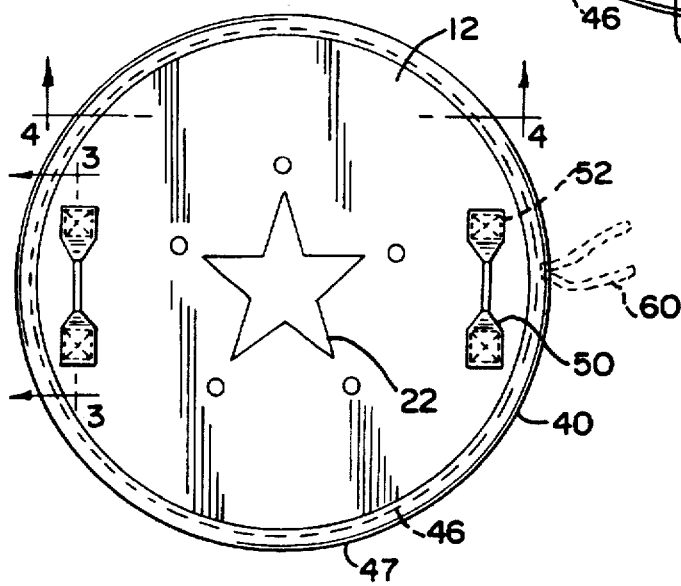
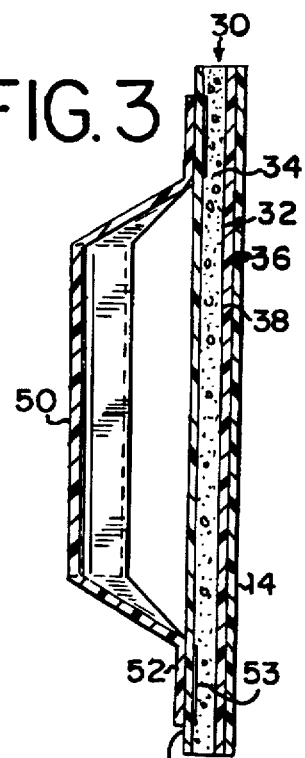
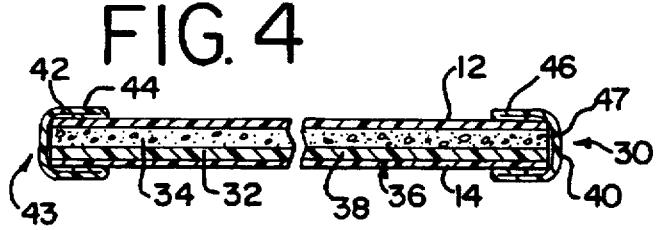
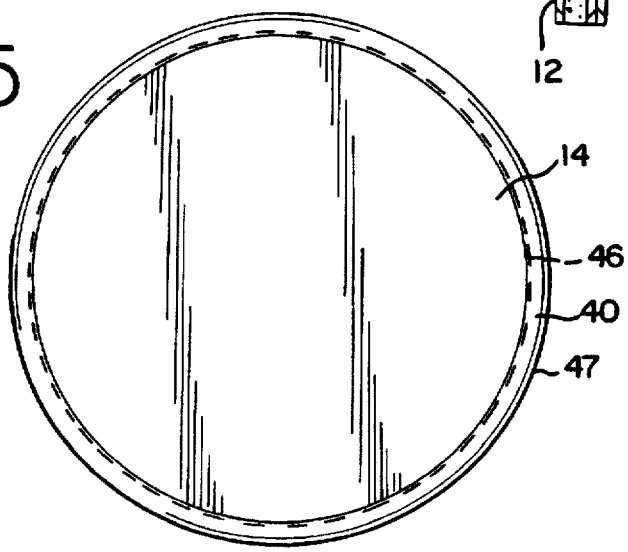

FABRIC COATED SLED OF COMPOSITE CONSTRUCTION

BACKGROUND OF THE INVENTION

The present invention relates generally to recreational sporting goods and, more particularly, to runnerless, flexible fabric-coated sleds.

Children have long enjoyed sliding down snow and ice-covered hills on a variety of vehicle types. The most traditional example of such a vehicle is the conventional sled featuring a wooden frame and steerable metal runners. Such sleds, however, are only useful on slopes covered with snow that has been firmly packed. These traditional sleds are relatively expensive and are bulky and heavy which makes them difficult to pull or carry up hills.

Lighter weight, runnerless sleds, such as toboggans, are also commonly used. Toboggans are long, flat-bottomed sleds made of thin boards curled at the front end. Toboggans overcome some of the problems of runnered sleds, but they are still relatively heavy, bulky and expensive. The prior art, however, features a number of additional runnerless sled variations.

Lightweight, saucer-shaped coaster sleds (such as disclosed in U.S. Pat. Nos. 2,493,315 and 2,971,767) are made of rigid plastic or metal and perform admirably as sleds. Other sleds take the form of tub-shapes also made of rigid plastic or metal as disclosed in U.S. Pat. No. 4,603,870. While such designs are relatively lightweight and inexpensive, they are still bulky. As a result, such sleds are difficult to carry up snow-covered hills and are inconvenient to stow, for example, in an automobile or a garage. Furthermore, metal versions of the sleds are prone to denting, while the thinner plastic versions are prone to splitting or rupturing when overly and excessively flexed.

The top surfaces of the saucer and tub-shaped sleds are hard and smooth. Such a surface is difficult for a rider to maintain contact with and is uncomfortable as the shock from bumps and the like are transmitted directly to the rider. While cushions have been developed for use on such sleds, as well as toboggans, they have to be tied on with string-like loops that frequently come loose.

The addition of handles to these saucer and tub-shaped style sleds presents yet another problem in that the handles are attached by punching slots into the body of the sled and feeding a rope or similar material through the slots. Due to the single layer construction of this type of sled, the handle ends protrude along the bottom of the sled which corrupts the bottom surface profile of the sled and results in additional drag which, in turn, degrades downhill speed.

Other runnerless sleds involve a carpet-like sheet of relatively thin and flexible plastic, as disclosed in U.S. Pat. No. 5,401,048. Although these inexpensive devices are lightweight and pliable for easy transport, their thinness does not provide a firm and smooth ground contact surface. Furthermore, the rider is not cushioned at all from the surface irregularities of the hill, which may create an uncomfortable ride.

Accordingly, an object of the invention is to provide a lightweight and compact sled which overcomes the aforementioned disadvantages of the prior art.

Another object of the invention is to provide a flexible sled that provides improved performance and has a cushion formed within the sled to provide a comfortable ride.

Another object of the invention is to provide a fabric-covered sled of composite construction that is economical to manufacture.

SUMMARY OF THE INVENTION

The present invention is directed to a fabric-covered sled of composite construction for recreational use. The sled has both a comfortable cushioned seat and is capable of good downhill speed. The sled incorporates durable fabric top and bottom covers connected together along their edges to define an internal cavity therebetween. The cavity encloses an interior cushioning assembly that includes a soft pad and a semi-rigid support member. The pad may include an open or closed cell foam pad that provides a cushioned seat for the user while the semi-rigid support member provides a firm backing for the bottom cover so that the semi-rigid support member bears against the bottom cover of the sled and against the surface of the ground.

These and other objects, features and advantages of the present invention will be clearly understood through consideration of the following detailed description.

BRIEF DESCRIPTION OF THE DRAWINGS

In the course of the following detailed description, reference will be frequently made to the accompanying drawings in which:

FIG. 1 is a perspective view of one embodiment of a fabric-covered sled of composite construction constructed in accordance with the principles of the present invention;

FIG. 2 is a top plan view of the sled of FIG. 1;

FIG. 3 is a sectional view of the fabric composite sled of FIG. 1 taken along line 3—3 and along the handle of the sled;

FIG. 4 is a sectional view of the sled of FIG. 1 taken along line 4—4 near an edge of the sled;

FIG. 5 is a bottom plan view of the sled of FIG. 1;

DESCRIPTION OF THE PREFERRED EMBODIMENT

Referring now to FIG. 1, one embodiment of the fabric-covered sled of composite construction constructed in accordance with the principles of the present invention is indicated generally at 10. Although the present invention is described hereinafter in terms of a saucer configuration as illustrated in the figures, it will be understood that the invention is not limited to such a configuration and that other alternative configurations may be employed while still obtaining the benefits of the invention. Such alternative configurations include, but are not limited to oblong rectangular and other configurations.

Figure 7:
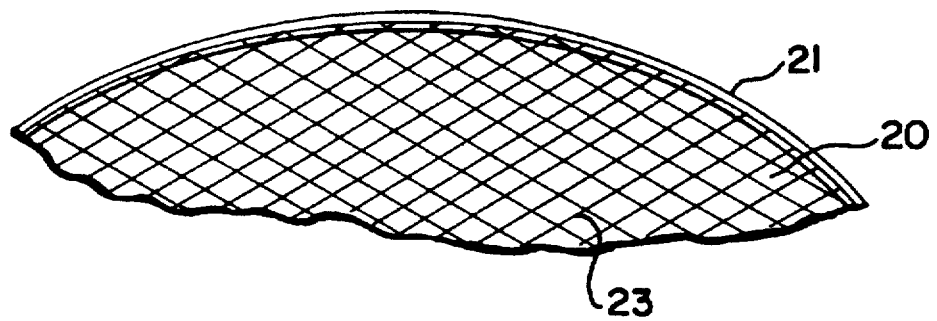
FIG. 7 is an enlarged detail view of the construction of the reinforced fabric bottom cover portion used in the sled of FIG. 1.

The sled 10 is fabric-covered. That is, it includes a top cover portion 12, formed from a durable fabric, and a bottom cover portion 14, also formed from a durable, but reinforced, fabric. The top cover portions 12 may be conveniently formed from a nylon fabric with a moisture impermeable barrier applied thereto on the bottom face thereof. The bottom cover portion 14 is also preferably formed from a moisture impermeable fabric, and may include reinforced fabrics such as a durable coarse weave nylon or polypropylene fabric 20 with a solid backing 21 applied to the bottom side thereof (FIG. 7). Reinforcing threads such as a coarse scrim 23 may be interwoven with the fabric 20 to provide support. Attractive visual indicia in the form of a dyed, screened or integrated graphic design 22 may be printed in the top cover portion 12 as illustrated in FIGS. 1 and 2.

An interior sled body assembly 30 is interposed between the two cover portions 12, 14. This body assembly 30 includes a cushion layer 32 formed from a suitable soft and flexible cushioning material, such as an open or closed cell foam pad 34 (FIGS. 3 and 4) and a relatively harder support layer 36 in the form of a durable plastic or cardboard pad 38. This support material 36 may be characterized as "semi-rigid", that is, it is flexible enough to permit the sled 10 to be rolled upon itself for storage and transport without permanently assuming the rolled shape, but rigid enough so that it presents a relatively hard surface to the ground through the bottom cover portion 14.

In construction of the sled 10, the cushion and support layers 32, 36 are cut to a particular configuration, such as the circular configuration illustrated. The cushioning layer 32 may be adhered to the support layer 36 and the top and bottom fabric cover portions 12, 14 are laid on opposite faces of the body assembly 30. An interconnecting fabric edge 40 is folded around the edges 42 of this composite body assembly 43, preferably with its ends 44 folded in upon itself, and stitched together through the body assembly as illustrated in FIG. 4. This stitching 46 is located interior of the sled edge 47 and durably binds the sled components 12, 14, 32 and 36 together into a single unit.

Figure 6:
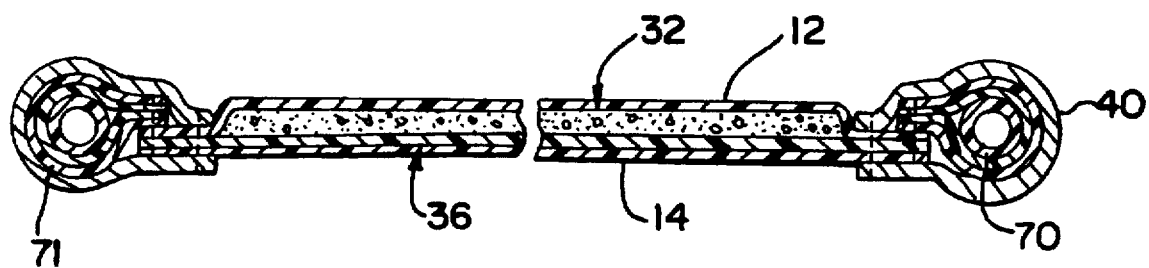
FIG. 6 is a sectional view of another embodiment of a fabric-covered sled of composite construction constructed in accordance with the principles of the present invention.

Alternatively, as shown in FIG. 6, a relatively rigid plastic hose or piping 70 in the shape of a ring may be inserted within the fabric edge 40 to provide rigidity to the sled edge and to assist in defining the overall shape of the sled. The piping 70 may be further enclosed within an outer fabric wrapping 71 within the edge 40.

The construction of the sled is economical in that no expensive plastic molding equipment is required for its manufacture. As a result, any company doing cut and sew operations could produce the sled.

As illustrated in FIGS. 2 and 3, one or more handles 50, also formed from a durable fabric, may be attached to the sled 10 at the top cover 12 thereof by stitching 52. The handles 50 may include backing members 53 on the opposite side of the top cover 12 to provide support for the attachment of the handles 50. As shown in FIG. 3, this results in handles that do not interfere with the bottom surface of the sled. As such, the bottom cover portion 14 may maintain a smooth profile which results in a lower coefficient of friction and a higher downhill speed.

Tying straps 60, shown in phantom in FIG. 2, may be attached to the edge 47 of the sled 10 also by stitching in order to permit the sled to be tied into a rolled-up position for ease of transport.

While the preferred embodiments of the invention have been shown and described, it will be apparent to those skilled in the art that changes and modifications may be made therein without departing from the spirit of the invention, the scope of which is defined by the appended claims.

What is claimed is:

1. A recreational sled of composite construction comprising:
opposing top and bottom cover portions, a sled body assembly interposed between the top and bottom cover portions, the sled body assembly including a cushioning layer and a support layer, the cushioning layer lying adjacent said top cover portion and the support layer lying adjacent said bottom cover portion, wherein each of said top cover portion, bottom cover portion, cushioning layer and support layers have common exterior perimeters, and the sled further including an outer edge enclosing said top cover portions, bottom cover portion, cushioning layer and support layer common exterior perimeters.

2. The recreational sled of claim 1, wherein said outer edge has two opposing rims that are stitched to each other through said top and bottom cover portions.

3. The recreational sled of claim 1, wherein said cushioning layer is attached to said support layer.

4. The recreational sled of claim 1, wherein said cushioning layer includes a foam pad.

5. The recreational sled of claim 1, wherein said support layer is formed from a semi-rigid material.

6. The recreational sled of claim 5, wherein said semi-rigid material is plastic.

7. The recreational sled of claim 1, wherein said top and bottom cover portions are formed from durable, moisture impermeable fabrics.

8. The recreational sled of claim 7, wherein said bottom cover portion fabric is a reinforced fabric.

9. The recreational sled of claim 1, further including at least one handle attached thereto.

10. The recreational sled of claim 9, wherein said handle is attached to said top cover portion.

11. The recreational sled of claim 1, wherein said sled has a circular configuration.

12. The recreational sled of claim 1, wherein said outer edge includes a fabric ring.

13. The recreational sled of claim 1, wherein said top and bottom cover portions are formed from different fabrics.

14. A flexible, fabric-covered sled, comprising:
a sled body assembly including a semi-rigid support layer having a predetermined thickness, a cushioning layer of thickness greater than the support layer thickness, the cushioning layer being disposed on one side of said support layer;
a durable bottom fabric cover portion disposed on one surface of said sled body assembly and a durable top fabric cover portion disposed on an opposite surface of said sled body assembly, at least said top and bottom fabric cover portions having common edges; and
a rim portion enclosing said sled body assembly between said top and bottom fabric cover portions, the rim portion being attached to said top and bottom fabric cover portions near the common edges thereof.

15. The flexible, fabric covered sled of claim 14, wherein said rim portion is attached to said top and bottom fabric cover portions by stitching.

16. The flexible, fabric covered sled of claim 15, wherein said bottom fabric cover portion is a reinforced plastic fabric.

17. The flexible, fabric covered sled of claim 14, further including at least one handle attached to said sled proximate to said top cover fabric portion thereof.

18. The flexible, fabric covered sled of claim 14, wherein said cushioning layer includes a foam pad and said support layer includes a sheet of semi-rigid material.

19. A recreational sled of multi-layer construction, the layers of the sled having a flexible nature so as to permit them to easily deform, yet rigid enough so as not to permanently retain a deformed shape, the sled including:
a bottom contact layer formed from a durable, moisture-impermeable material, a semi-rigid support layer disposed on top of said bottom contact layer, a cushioning layer disposed on top of said support layer and a top seating layer disposed on top of said cushioning layer, all of said layers having generally common edges, said sled further including a perimetral rim extending over said layer common edges, the perimetral rim being attached at least to said bottom contact layer and said top seating layer proximate said common edges thereof to thereby enclose said cushioning and support layers therebetween.

20. The sled as claimed in claim 14, wherein said perimetral rim is attached to said top seating layer and bottom contact layer by stitching.

21. A recreational sled of multi-layer construction, the layers of the sled having a flexible nature so as to permit them to easily deform, yet rigid enough so as not to permanently retain a deformed shape, the sled including:

a bottom contact layer formed from a durable moisture-impermeable material, a top seating layer, a cushioning layer disposed between said bottom contact layer and said top seating layer, said top seating layer and bottom contact layer having generally common edges, said sled further including a perimetral rim extending over said common edges of said top seating and bottom contact layers, the perimetral rim being attached at least to said seating and bottom contact layers proximate said common edges thereof to thereby enclose said cushioning layer therebetween.

22. A recreational sled of composite constructions, comprising:

opposing top and bottom cover portions and a cushioning layer interposed between said top and bottom cover portions, each of said top and bottom cover portions having common exterior perimeters, and said sled including an outer edge that encloses said common exterior perimeter of said top and bottom cover portions to contain said cushioning layer therebetween.

23. The recreational sled of claim 22, wherein said outer edge has two opposing rim portions that are stitched to each other through said top and bottom cover portions.

24. The recreational sled of claim 22 wherein said outer edge includes a fabric ring.

* * * * *